United States Patent
Cortes, Jr. et al.

(10) Patent No.: US 8,266,258 B1
(45) Date of Patent: Sep. 11, 2012

(54) ENHANCED THROTTLE MANAGEMENT SYSTEM

(75) Inventors: Miguel A. Cortes, Jr., San Antonio, TX (US); Craig M. Bush, San Antonio, TX (US); Sudarshan Rangarajan, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 9 days.

(21) Appl. No.: 12/951,572

(22) Filed: Nov. 22, 2010

Related U.S. Application Data (63) Continuation of application No. 11/924,417, filed on Oct. 25, 2007, now Pat. No. 7,840,653.

(51) Int. Cl.
*G06F 15/177* (2006.01)
(52) U.S. Cl. ........ 709/220; 709/203; 709/221; 709/222; 709/223; 709/224; 370/254; 718/102; 718/104; 718/105
(58) Field of Classification Search .................. 709/203, 709/220, 226, 221, 222, 223, 224; 718/102, 718/104, 105; 370/254
See application file for complete search history.

(56) References Cited

U.S. PATENT DOCUMENTS

| | | | |
|---|---|---|---|
| 5,835,482 A | 11/1998 | Allen | |
| 6,175,869 B1 | 1/2001 | Ahuja et al. | |
| 6,182,109 B1 | 1/2001 | Sharma et al. | |
| 6,209,018 B1 | 3/2001 | Ben-Shachar et al. | |
| 6,714,975 B1 * | 3/2004 | Aggarwal et al. | 709/224 |
| 6,728,961 B1 | 4/2004 | Velasco | |
| 6,859,834 B1 | 2/2005 | Arora et al. | |
| 6,865,601 B1 | 3/2005 | Cherkasova et al. | |
| 6,950,848 B1 | 9/2005 | Yousefi'zadeh | |
| 7,219,346 B2 | 5/2007 | Patiejunas | |
| 7,225,244 B2 | 5/2007 | Reynolds et al. | |
| 7,263,597 B2 | 8/2007 | Everdell et al. | |
| 7,379,994 B2 * | 5/2008 | Collazo | 709/224 |
| 7,748,004 B2 * | 6/2010 | Patiejunas | 718/102 |
| 7,975,001 B1 * | 7/2011 | Stefansson et al. | 709/203 |
| 2001/0010053 A1 | 7/2001 | Ben-Shachar et al. | |
| 2004/0111506 A1 | 6/2004 | Kundu et al. | |
| 2004/0267916 A1 * | 12/2004 | Chambliss et al. | 709/223 |
| 2004/0268176 A1 | 12/2004 | Greenlee et al. | |
| 2005/0262183 A1 | 11/2005 | Colrain et al. | |
| 2008/0222646 A1 | 9/2008 | Sigal et al. | |
| 2008/0244590 A1 * | 10/2008 | Chambliss et al. | 718/102 |
| 2011/0145383 A1 * | 6/2011 | Bishop et al. | 709/223 |

* cited by examiner

*Primary Examiner* — Thu Ha Nguyen
(74) *Attorney, Agent, or Firm* — Brooks, Cameron & Huebsch, PLLC (57) ABSTRACT

Techniques for enhancing a throttle management system are disclosed. A throttle management system can be configured to scale down a number of permits available for connections to a data source. The throttle configuration parameters can be viewed by an administrator and modified during the runtime operation of the computer system effecting the throttle.

21 Claims, 6 Drawing Sheets

ENHANCED THROTTLE MANAGEMENT SYSTEM

CROSS-REFERENCE TO RELATED SUBJECT MATTER

This application is a continuation of U.S. patent application Ser. No. 11/924,417, filed on Oct. 25, 2007. This application is also related in subject matter to, and incorporates herein by reference in its entirety, each of the following: U.S. patent application Ser. No. 11/143,071, filed on Jun. 6, 2005, now U.S. Pat. No. 7,818,393, issued on Oct. 19, 2010; and U.S. patent application Ser. No. 12/906,794, filed on Oct. 18, 2010.

BACKGROUND

Connecting users to a remote system using an application component is well-known and readily appreciated by those of skill in the art. Conventionally, a user can use a browser to communicate a request to a web server. The web server can process the request and forward it to an application server that includes a predetermined or limited number of threads available for handling requests. The application server can allocate a thread to the request, and the thread service the request by, for example, performing a function, or retrieving a file. However, as the number of available threads on the application server may be limited, the application server typically may only be able to handle a predetermined number of requests before the requests are queued. In the event the application server experiences an outage when there are a large number of requests, users may end up waiting a significant amount of time to find out that the application server has experienced an outage, which can result in a diminished user experience. Furthermore, the allocation of threads and the queuing of requests to an unavailable remote system ties up resources which could be used more efficiently.

A conventional solution for this problem is the use of connection pooling that involves the establishment of a pool of database connections between the application server and the data source which can be shared by application components on the application server. This limits the creation of new connections because existing connections from the pool of database connections may be used, which saves resources. However, when the application server goes down, the diminished user experience associated with the amount of time a user waits to find out that the remote system has experienced an outage remains.

Accordingly, it would be desirable to provide a system for outage avoidance absent the disadvantages found in the prior methods discussed above.

SUMMARY

In one implementation, a method includes, but is not limited to, receiving, from a client, a request for configuration parameters of a throttle coupled to a data source, the configuration parameters including a maximum number of permits to be issued by the throttle to a plurality of modules operable to perform an operation on the data source, an expected response time for completing the operation on the data source, and a number of available permits to assign to the plurality of modules, wherein the number of available permits is configured in accordance with whether a previous operation performed by a first module of the plurality of modules was completed within the expected response time; transmitting, from a server, the configuration parameters of the throttle; receiving, from the client, at least one modification to at least one configuration parameter; and applying the at least one modification to the at least one configuration parameter of the throttle during runtime operation of the server. In addition to the foregoing, other method aspects are described in the text, figures, and claims forming a part of the present disclosure.

It can be appreciated by one of skill in the art that one or more various aspects of the disclosure may include but are not limited to circuitry and/or programming for effecting the herein-referenced method aspects; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations, and omissions of detail. Those skilled in the art will appreciate that the summary is illustrative only and is not intended to be in any way limiting.

DETAILED DESCRIPTION OF ILLUSTRATIVE EMBODIMENTS

Figure 1:
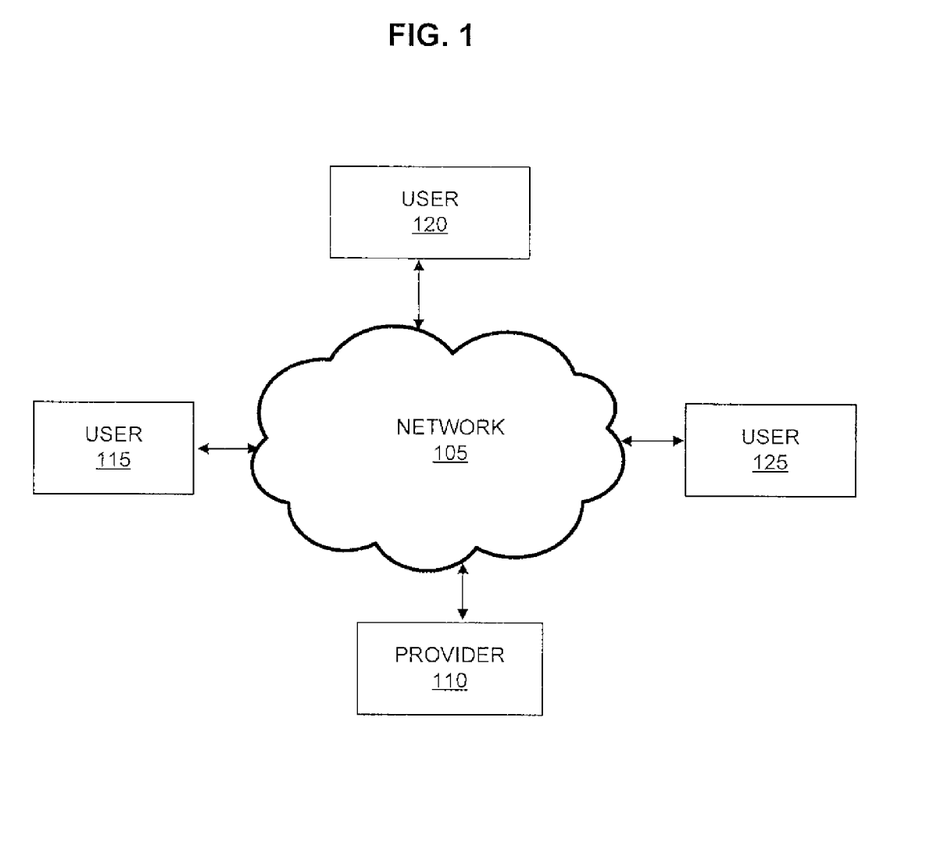
FIG. 1 depicts an example operational environment that can be used to practice aspects of the present disclosure.

Referring now to FIG. 1, in one embodiment, a system for outage avoidance is illustrated. The system includes a computer network 105 such as, for example, a Transport Control Protocol/Internet Protocol (TCP/IP) network (e.g., the Internet or an intranet.) A provider 110 can be operably coupled to the network 105 and a plurality of users 115, 120, and 125 can also be operably coupled to the network 105 in order to allow communication between the users 115, 120, and 125 and the provider 110.

Each of the provider 110, and the users 115, 120, and 125 include a respective network interface for communicating with the network 105 (e.g., outputting information to, and receiving information from, the network 105), such as by transferring information (e.g., instructions, data, signals) between such users 115, 120, and 125 and the network 105. Accordingly, through the network 105, the provider 110 communicates with the users 115, 120, and 125, and the users 115, 120, and 125 communicate with the provider 110.

For clarity, FIG. 1 depicts only one provider 110. However, the system may include a plurality of providers which are substantially identical to the provider 110. Likewise, for clarity, FIG. 1 depicts only three users 115, 120, and 125. However, the system may include a plurality of users which are substantially identical to the users 115, 120, and 125.

Each of the provider 110 and the users 115, 120, and 125 include a respective information handling system (IHS), a subsystem, or a part of a subsystem for executing processes and performing operations (e.g., processing or communicating information) in response thereto, as discussed further below. Each such IHS is formed by various electronic circuitry components and/or software components. Moreover, as illustrated in FIG. 1, all such IHS's are coupled to each other. Accordingly, the provider 110 and the users 115, 120, and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch, and other devices coupled to a network (e.g. the network 105).

Figure 2:
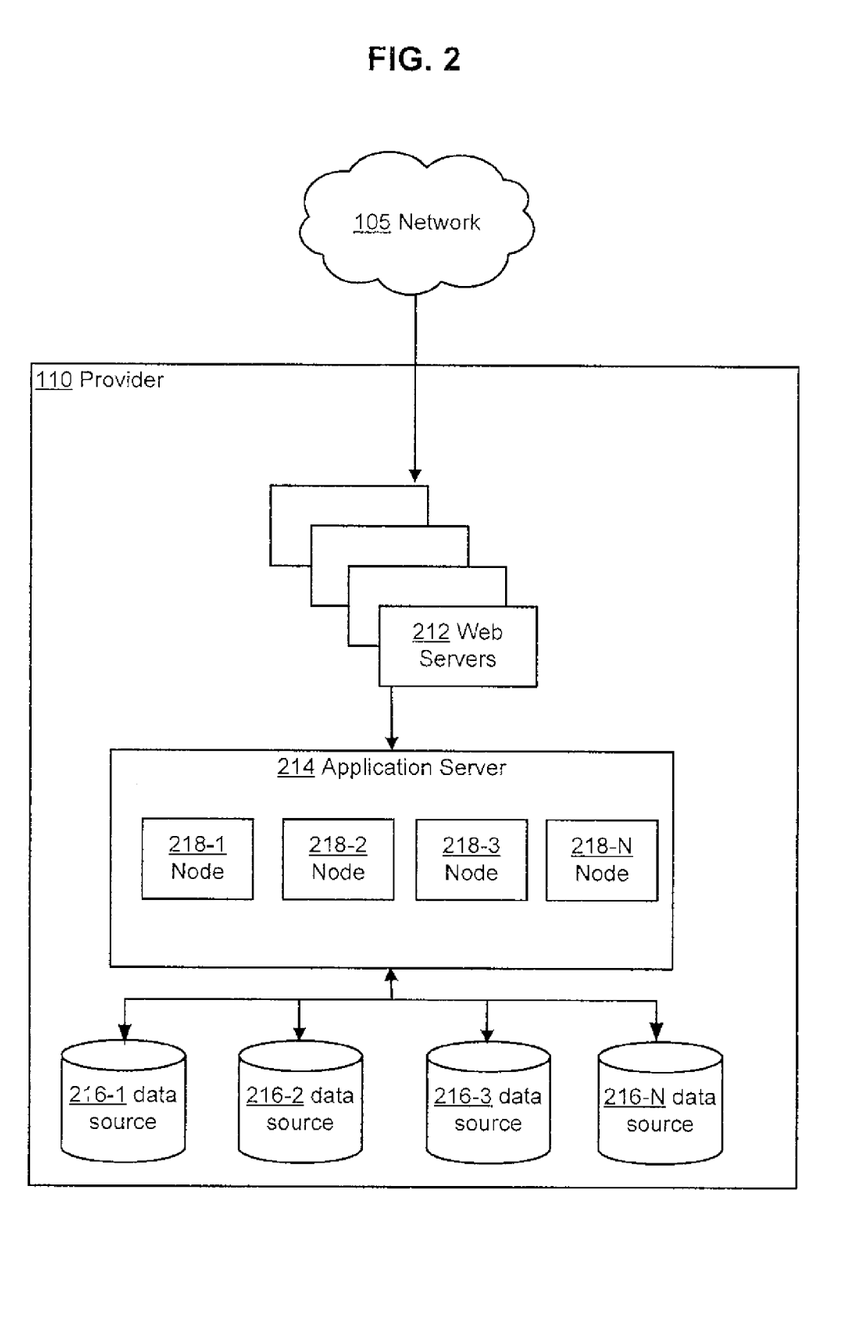
FIG. 2 depicts an example provider.

Referring now to FIG. 2, the provider 110 is illustrated in more detail. For example, one or more web servers 212 such as, for example, Hyper Text Transfer Protocol (HTTP) servers, can be maintained by the provider 110, and can be operably coupled to the network 105, described above with reference to FIG. 1. An application server 214, e.g., an IHS 130 in some embodiments, can be maintained by the provider 110, and can be operably coupled to the web server(s) 212. In some example embodiments, the application server 214 can include one or more nodes 218-1 through 218-N (where N is an integer greater than 1), e.g., logical machines, and/or physical machines that can include one or more virtual machines configured to service requests received from clients such as logon requests, request to view account info, etc. When a request is received by a node, node 218-1 for example, the node 218-1 carries out the requested function by accessing one or more data sources 216-1 through 216-N (where N is an integer greater than 1) to perform an action, e.g., a read/write request, etc. In some implementations, each node 218-1 through 218-N can include a java database connectivity API (JDBC), or a java connector architecture (J2C) configured to query data sources 216-1 through 216-N. In some embodiments data sources 216-1 through 216-N can be located remote from the provider 110, and can be operably coupled to the provider 110. Thus, as the web server(s) 212 receive requests, they can route the requests to a specific node that is configured to handle such request, and the node can access the appropriate data source to perform the desired function.

Figure 3:
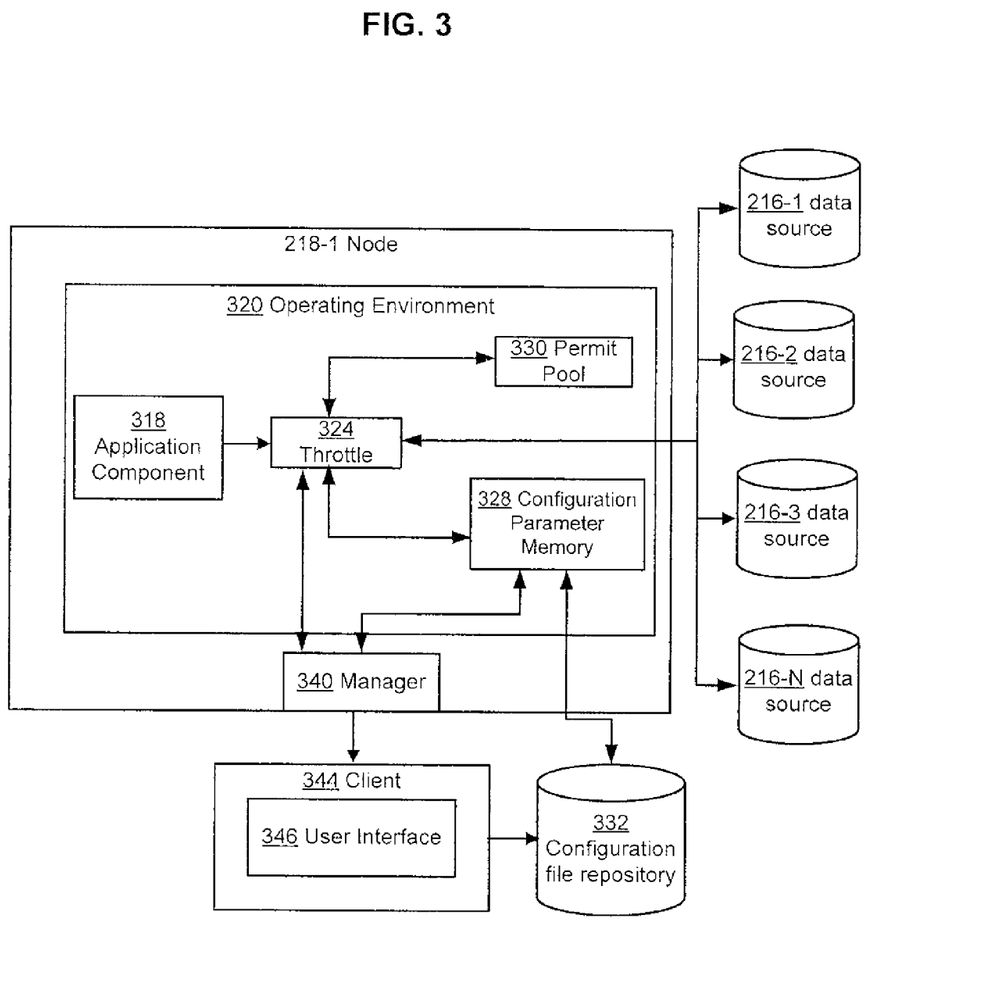
FIG. 3 depicts an example node of an application server.

Referring now to FIG. 3, it depicts an example node 218-1 of an application server 214 depicted in FIG. 2 at a lower level of detail. An application component 318, such as, for example, a servlet, a java bean, or an enterprise java bean (EJB) configured to perform a function such as accessing user accounts, is included in node 218-1, and can be operably coupled to the application server 214, described above with reference to FIG. 2. An operating environment 320, e.g., a virtual machine such as a Java Virtual Machine® from Sun Microsystems®, or a physical machine in other embodiments, can be included in node 218-1, and can be configured to effect the application component 318, and interface with one or more of the data sources 216-1 through 216-N. In this example implementation, the operating environment 320 can additionally be configured to effect a throttle 324 which can be operably coupled to a set of configuration data stored in configuration parameter memory 328, e.g., RAM. The throttle 324 can be operably coupled to one or more of data sources 216-1 through 216-N, and a permit pool 330. The permit pool 330 can include a predetermined or limited number of permits available for modules, e.g., threads, or processes, attempting to access one or more of the data sources 216-1 through 216-N.

In some embodiments of the present disclosure, the throttle 324 can be configured to keep track of a number of variables, such as a configurable number of permits in use, a configurable current available number of permits for use, a configurable maximum number of permits, a configurable minimum number of permits, a configurable expected response time for an operation to be completed in, and/or a configurable enable/disable calls mechanism, e.g., a hardware switch, or in other embodiments, a software method or routine. In some example embodiments, the configurable number of permits in use can be the number of permits being used to attempt to access a data source at any given time. For example, if 6 permits exist, and 5 threads are accessing a data source, the number of permits in use would be 5. The current number of available permits for use can include the number of permits currently available in the permit pool 330. This number can be configured by the throttle 324 based on the performance of a prior call to the data source, e.g., the number depends on the status of the data source. The configurable maximum number of permits can include the maximum number of permits which may be available at any given time. The configurable minimum number of permits is the minimum number of permits which may be available for use at any given time. Furthermore, the enable/disable mechanism can include a setting operable to direct the throttle 324 to deny all requests when it is enabled regardless of the number of permits available.

Continuing with the description of FIG. 3, it additionally depicts a configuration file repository 332 for configuration files. As illustrated in FIG. 3, in some embodiments of the present disclosure, the configuration file repository 332 can be remote from node 218-1 however, the disclosure is not limited to this embodiment and other embodiments exist. The configuration repository can be configured to store the configuration data for a throttle 324. When node 218-1 is supplied with power, or when the operating environment 320 is enabled, the throttle 324 can acquire configuration parameters from the configuration file repository 332, and store them in configuration parameter memory 328, and the throttle 324 can use the configuration data in configuration parameter memory 328 to affect how calls to the data sources 216-1 through 216-N are handled.

FIG. 3 additionally depicts a manager 340, and a client 344 with a user interface 346. For example, in some embodiments of the present disclosure, a client 344 can include a terminal or a personal computer configured to transmit and receive information from the manager 340 and render the information in a user interface 346 of the client 344 such as a browser. The manager 340 can include an API for the management, and monitoring of resources such as applications, devices, services and operating environments such as operating environment 320. In at least one embodiment of the present disclosure, the manager 340 includes an architecture similar to that of Java Management Extensions® from Sun Microsystems®.

Figure 4:
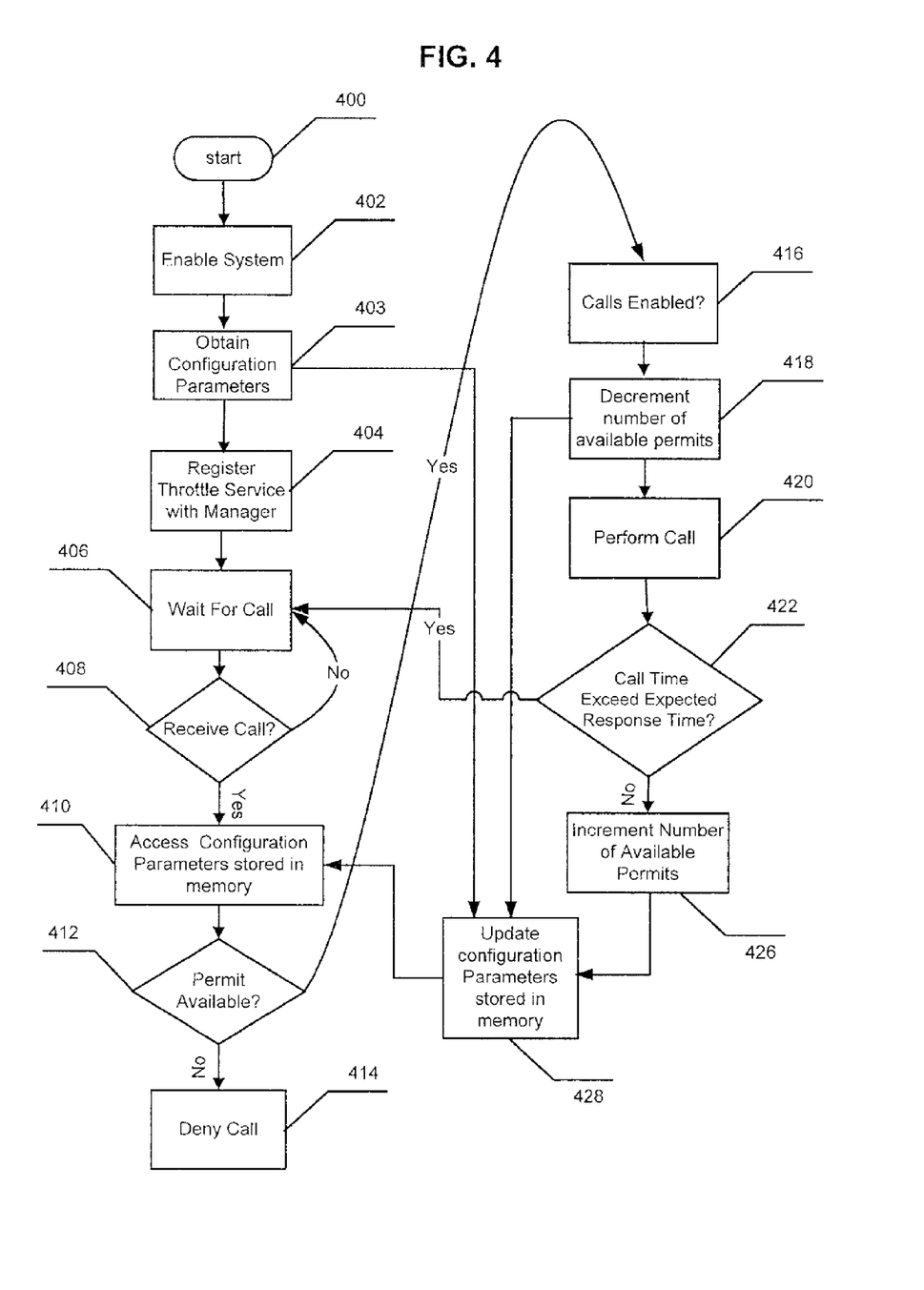
FIG. 4 depicts an operational flowchart illustrating implementations of the present disclosure.
Figure 5:
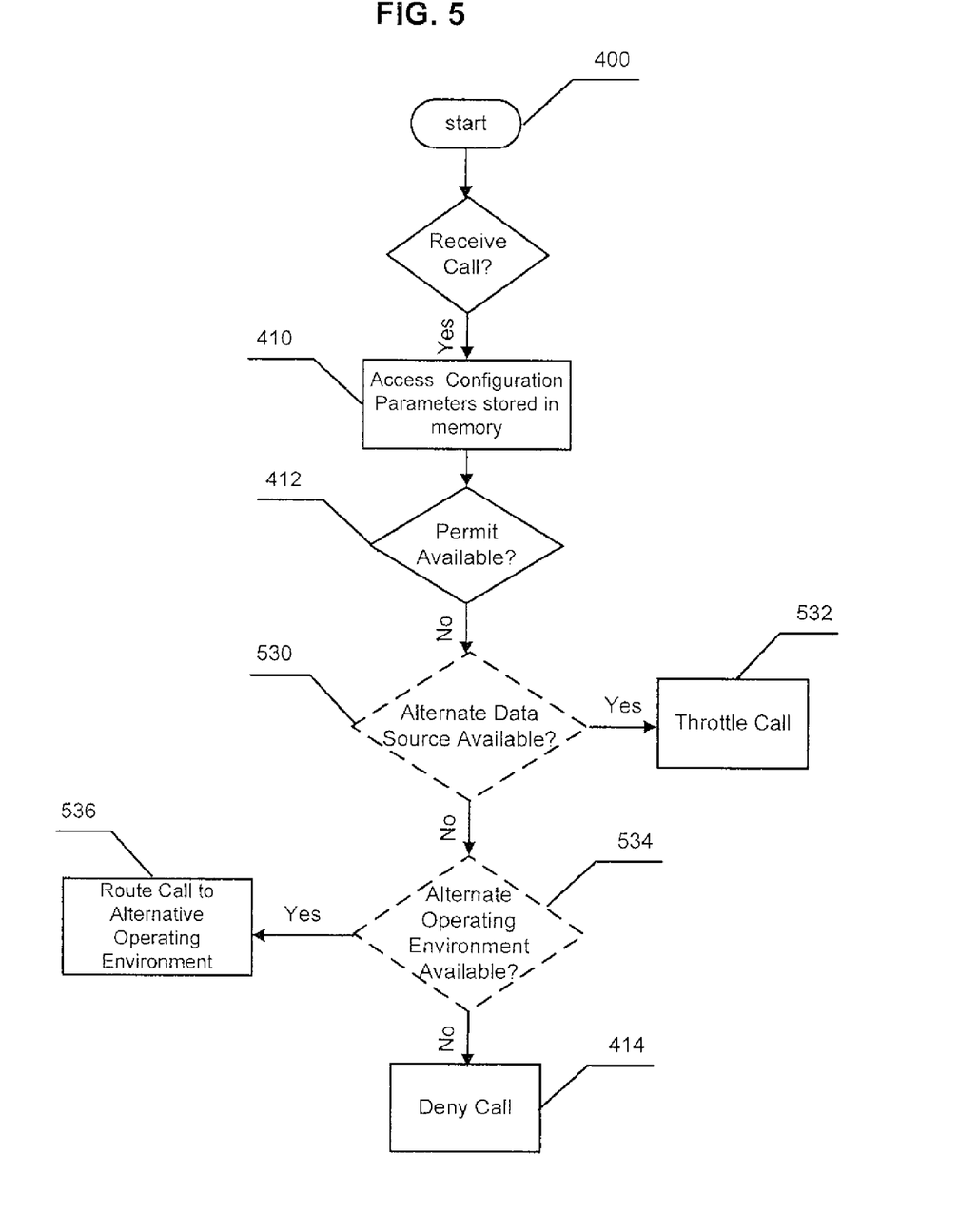
FIG. 5 depicts an operational flowchart illustrating implementations of the present disclosure.
Figure 6:
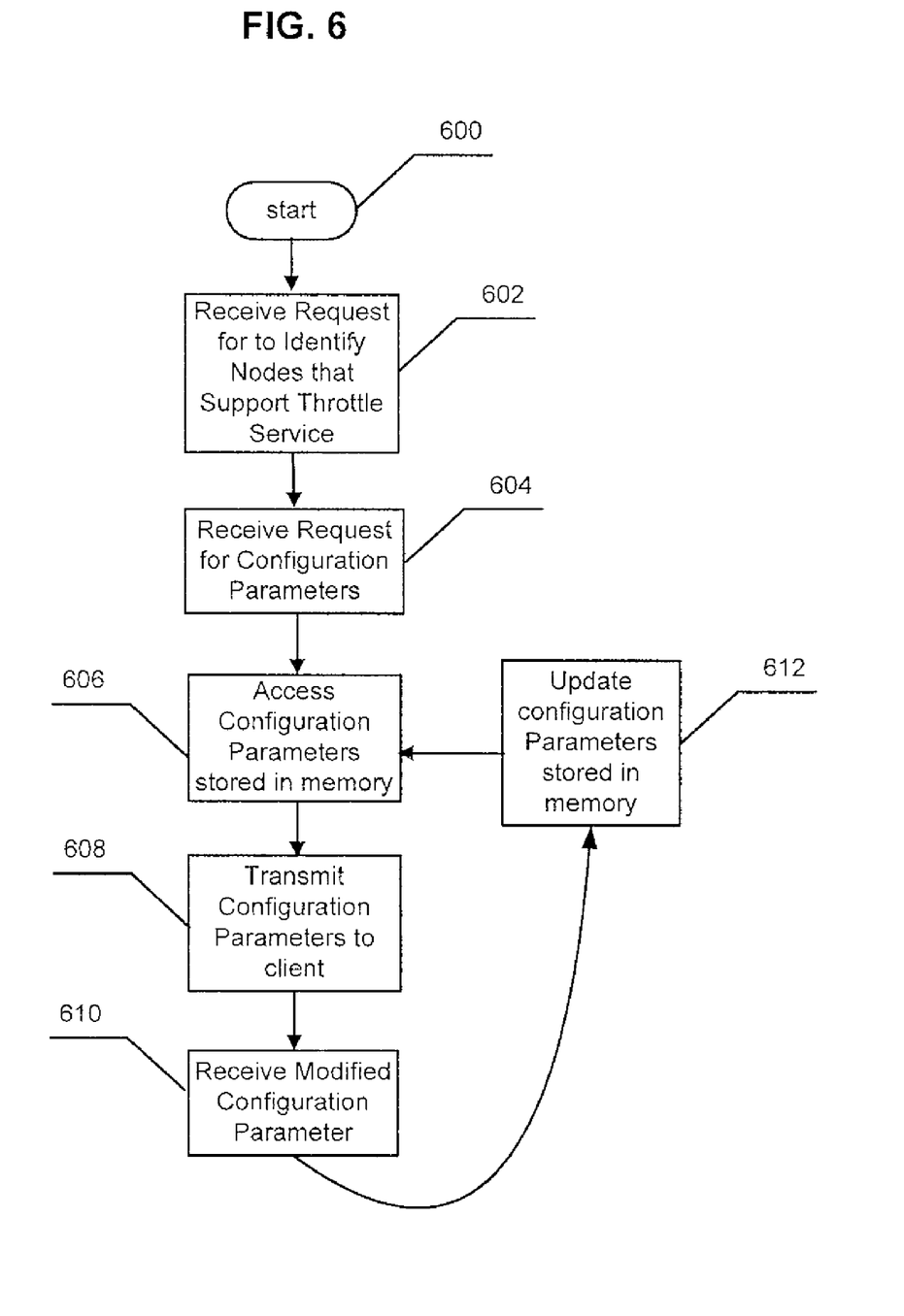
FIG. 6 depicts an operational flowchart illustrating implementations of the present disclosure.

Referring now to FIGS. 4, 5 and 6 in conjunction with FIG. 1 through FIG. 3, they depict operational flowcharts illustrating implementations of the present disclosure. For ease of understanding, the flowcharts are organized such that they present implementations via an overall "big picture" viewpoint.

Referring now to FIG. 4, it depicts an example operational flow chart that includes example operations directed towards throttling connections to data sources 216-1 through 216-N. Operation 400 begins the operational process, and operation 402 illustrates enabling a node, such as node 218-1. For example, a node of an application server 214 can be enabled after it is supplied with power, or receives a request to enter an operational state from a standby state. In one embodiment, node 218-1 may become operational after a sufficient number of HTTP requests are received by the web servers(s) 212, and node 218-1 is needed to implement load balancing techniques. In other embodiments, node 218-1 can become operational after the application server 214 is powered on and the throttle 324 loads configuration parameters obtained from the configuration file repository 332 into configuration parameter memory 328. Continuing with the example, operation 404 illustrates registering a throttle service with the manager 340. For example, and generally referring to FIG. 3, in some implementations, when node 218-1 is enabled, it registers its services with a manager 340. The manager 340 can act as a registry for all the services that can be performed by the operating environment 320 and, for example, can expose one or more interfaces for manipulating the services such as a service implemented by throttle 324.

Continuing with the example, after the operating environment 320 registers with the manager 340, and as shown by operations 406 and 408, it enters a wait state where it awaits requests to perform one or more operations on one or more data sources 216-1 through 216-N. As illustrated by operation 410, once the operating environment 320 receives a request, throttle 324 accesses the configuration parameters in configuration parameter memory 328, and determines whether a permit is available to use when servicing the request. Similar to that described above, if there are no permits available, i.e., all the available permits are in use, the maximum number of permits is set to 0, or the throttle is configured to deny calls, and the call will fail as shown at operation 414. When a permit is available, i.e., the maximum number of permits have not been issued, or put another way, a hardware or software counter indicates that a permit is available, and throttle 324 is configured to allow calls, as shown by operation 416, the throttle 324 can decrement the number of available permits as shown in operation 418, in configuration parameters memory 328, place a timestamp on the permit, and enable a thread to perform the call at operation 420.

Continuing with the example, and referring to decision point 422, once the call is complete, i.e., the thread performing the call has finished and has performed a close operation, the throttle 324 can be configured to compare the time it took to perform the call against the timestamp in the permit, and a method can be configured to determine whether the time it took to perform the call was longer than the expected response time obtained from the configuration parameter memory 328. As shown by decision point 422, if the throttle 324 determines that the call time exceeded the expected response time, then the throttle 324 can effectively decrease the number of available permits by not incrementing the counter that reflects how many permits are available. As shown by operation 426, if the call time is less than the expected response time, then the counter indicative of the number of available permits can be incremented, and the configuration parameters stored in configuration parameter memory 328 can be updated to reflect how many permits are available.

A specific example of the operational process can include the throttle 324 receiving a request to issue a permit to a thread in order to verify an account logon request. The throttle 324 can access the current configuration parameters stored in temporary memory and receive information that identifies, for example, that 5 permits out of 10 are available, and the expected response time for these types of requests is 15 milliseconds. Since five permits are available in this example, the throttle 324 can allow the call, and decrement the number of available permits to four. When the call is complete, the throttle 324 can check the time that elapsed since the permit was checked out and determine whether the call took longer than 15 milliseconds. If it did not, the throttle 324 can increment the number of available permits stored in memory back to five otherwise, the number will remain at four. In this example, if requests consistently take too long and the system resources are being consumed by an unresponsive data source, the throttle 324 can scale back the connections to it.

Referring now to FIG. 5, it depicts an alternative embodiment of the operational procedure described in FIG. 4. In this embodiment, instead of denying a call as shown by operation 414 of FIG. 4, when a permit is not available for a specific data source such as data source 216-1, the throttle 324 can receive additional configuration parameters 328 from memory as shown by operation 410, directing throttle 324 to perform one or more, of the example operations depicted in FIG. 5. These additional parameters can enable the throttle 324 to determine, as shown by operation 530, whether it is throttling connections to an alternative data source such as data source 218-2. If there is such a data source 216-2, and as shown by operation 532, the throttle 324 can perform similar operations as shown in FIG. 4. For example, in some embodiments a single throttle can be used to throttle connections to multiple backend databases that include mirror images of the same data. In this embodiment, a throttle can determine that there are no permits available for data source 216-1, e.g., a file in data source 218-1 may have been taking an abnormally long time to open and a throttle has scaled back connections to it and reconfigure the call to access data source 218-2. In this example, a throttle can issue the permit from permit pool 330 and the call can be completed.

Continuing with the example, at decision point 534, if all the data sources that throttle 324 uses are unavailable, in some example embodiments, the throttle 324 can be configured to route the call to a node in the same or a different operating environment of the application server 214 as shown by operations 536. If there are no nodes available to service the call, the call can then be denied as shown by operation 414. In this example, there could be multiple operating environments that service the same types of requests, and the configuration parameters can include information indicating what operating environment a particular throttle should route calls to if, for example, the throttle is set to deny all calls, or there are no available permits in data pool 330.

Referring again to FIG. 3, in some embodiments of the present disclosure an administrator can connect to configuration file repository 332 and modify the files stored therein. In these embodiments, the administrator can modify the configuration parameters for one or more throttles while the node 218-1, or operating environment 320 is offline, or on standby. When the throttle 324 enters an enabled state, it can obtain configuration parameters from the configuration file repository 332 and store them in configuration parameter memory 328. In some embodiments, multiple throttles, across multiple operating environments, can use the same configuration file if, for example, they are copies of each other, i.e., in some example embodiments the provider can maintain multiple logon servers that each have their own account management server, and the throttles coupled to these servers can all use the configuration settings obtained from one central file.

Referring now to FIG. 6, in conjunction with FIGS. 1-3, in some example instances a series of operations can be running in parallel to those of operations of FIG. 4 and/or FIG. 5. The operations in FIG. 6 can be running in an operational environment that includes an application server 214 that effects multiple nodes 218-1 through 218-N. In turn, each one of these nodes 218-1 through 218-N can include one, or more operating environments such as the operating environment 320 depicted in FIG. 3. Each one of the operating environments in a node can be managed by a manger such as manager 340. As shown by operation 602, in this example, the manager 340 can be configured to receive requests from client 344 for the services that the operating environment(s) can perform.

Since the throttles register their service with the manager 340 at operation 404 of FIG. 4, the manager 340 can provide a list of operating environments that support throttling. In this example, a user interface of the client 344 can render a list of nodes that support throttling, and the administrator can pivot on the information. For example, the administrator may want to view all the throttles that service user account read/write requests. In this example, the user interface 346 can render information about each throttle, including the configuration parameters files stored in of configuration file repository 332.

Referring to operations 604, 606, and 608 of FIG. 6, if the administrator is interested in a particular throttle, the manager 340 can additionally access the runtime configuration parameters stored in configuration parameter memory 328 that the throttle 324 is using, and transmit one or more packets of information indicative of the parameters to the client 344. In some embodiments, this can occur in real time. For example, if a throttle currently has four permits checked out, the user interface can reflect this information. In this case, the user interface 346 can depict how each throttle in the application server 214 is operating. Continuing with the example, once the client 344 receives configuration parameters stored in configuration parameter memory 328 that the throttle 324 is currently using, in some implementations an administrator can modify one or more of them via the user interface 346 of the client 344, and transmit one or more packets of information indicative of the change back to the manager 340 at operation 610.

In some example implementations, a modified configuration parameter can include a parameter changed by an administrator. For example, a user interface 346 of the client 344 can depict information at various levels of detail, and enable an administrator, for example, to modify the configuration parameters for one or all of the throttles. For example, an administrator can access the configuration parameters of an entire class of throttles, e.g., all the throttles that throttle connections to a backend database that includes insurance premium data. In this instance, an administrator could change the parameters that would affect every connection to a database that includes insurance premium data. Additionally, an administrator of the system can select a specific throttle 324, throttling connections to a specific data source 316-1 and affect how this throttle behaves. Put another way, in some embodiments, an administrator can modify the configuration parameters for a specific throttle such as throttle 324 and leave all the other throttles that access similar data alone. In a specific example, the administrator can monitor how the threads of a specific virtual machine accessing a specific data source 216-1 are responding, and decide to manually adjust the expected response time for calls. In this case, the administrator could change the value from, for example, 15 milliseconds to 20 milliseconds, and select a submit button. The manager 340 can be configured to receive a signal indicative of the modified configuration parameter, and modify the configuration parameters that the throttle 324 uses as shown by operation 612.

In at least one specific instance, an administrator of a system may want to deny all calls to a specific data source because, for example, the administrator wants to perform maintenance on the data source, the data source is functioning incorrectly and using too many system resources, the administrator is upgrading the hardware, software, and/or firmware of a data sources, etc. Instead of disabling the web server(s) 212, or taking the entire application server 214 offline, the administrator can toggle a enable/disable flag in the configuration parameters stored in configuration parameter memory 328 displayed in the user interface 346, and the manager 340 can either configure throttle 324 to either deny all calls, or throttle calls. If a subsequent call is made by to the operating environment, throttle 324 can access the modified parameters stored in configuration parameter memory 328, determine that the disable flag has been set, and refuse to issue a permit to a thread even if there are permits available in the permit pool 330. Put another way, the administrator of the system can effectively disable an application server 214 without having to take it offline.

In some embodiments of the present disclosure, in addition to disallowing calls to a data source 216-1, the administrator can specify a data source 216-2 to redirect calls to. For example, in some instances an administrator will want to take a data source 216-1 offline that includes information for a specific service, however the administrator may have configured another data source 216-2 to include the same information. In this example, the user interface 346 of the client 344 can be configured to allow an administrator to enable/disable calls to a data source 216-1, and specify an alternate data source 216-2 to use during the runtime operation of the throttle 324. In this instance, the throttle 324 can receive the call, obtain configuration parameters that specify an alternate data source 216-2, and route the call to that data source 216-2.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A computing apparatus for modifying configuration settings for a throttle management system, the computing apparatus comprising:
   a processor;
   a memory coupled to the processor and having computer readable instructions stored thereon, the computer readable instructions executed by the processor to:
   receive, from a client, a request for configuration parameters of a throttle coupled to a data source, the configuration parameters, to be provided to the client, including an expected response time for completing an operation on the data source, wherein the expected response time is determined by a time to complete a prior call to the data source, and a number of available permits to assign to the plurality of modules, wherein the number of available permits is adjustably configured in accordance with whether a previous operation performed by a first module of the plurality of modules was completed within the expected response time;
   transmit to the client, from a server, the configuration parameters of the throttle;
   receive, from the client, at least one modification to at least one configuration parameter based upon whether the previous operation was completed within the expected response time; and apply the at least one modification to the at least one configuration parameter of the throttle during runtime operation of the server.

2. The apparatus of claim 1, wherein the configuration parameters include a parameter operable to direct the throttle to deny all calls made to the data source.

3. The apparatus of claim 2, wherein the data source includes a plurality of data sources.

4. The apparatus of claim 2, further comprising computer readable instructions executed by the process to:

receive a call to access a data source;

access the at least one modified configuration parameter; and deny all calls to the first data source based on the at least one modified configuration parameter.

5. The apparatus of claim 1, wherein the throttle coupled to the data source includes a plurality of throttles, each throttle of the plurality coupled to at least one of a plurality of data sources.

6. The apparatus of claim 5, further comprising computer readable instructions executed by the process to modify a first configuration parameter of the throttle associated with a first data source of the plurality.

7. The apparatus of claim 6, wherein the first configuration parameter includes a setting operable to direct the throttle to deny all calls made to the first data source, and to direct the throttle to send calls made to the first data source to a second data source of the plurality.

8. A method for modifying configuration settings for a throttle management system, the method comprising:

receiving, from a client, a request for configuration parameters of a throttle coupled to a data source, the configuration parameters, to be provided to the client, including an expected response time for completing an operation on the data source, wherein the expected response time is determined by a time to complete a prior call to the data source, and a number of available permits to assign to the plurality of modules, wherein the number of available permits is adjustably configured in accordance with whether a previous operation performed by a first module of the plurality of modules was completed within the expected response time;

transmitting to the client, from a server, the configuration parameters of the throttle;

receiving, from the client, at least one modification to at least one configuration parameter based upon whether the previous operation was completed within the expected response time; and applying the at least one modification to the at least one configuration parameter of the throttle during runtime operation of the server.

9. The method of claim 8, wherein the configuration parameters include a parameter operable to direct the throttle to deny all calls made to the data source.

10. The method of claim 9, wherein the data source includes a plurality of data sources.

11. The method of claim 9, further comprising:

receiving a call to access a data source;

accessing the at least one modified configuration parameter; and denying all calls to the first data source based on the at least one modified configuration parameter.

12. The method of claim 8, wherein the throttle coupled to the data source includes a plurality of throttles, each throttle of the plurality coupled to at least one of a plurality of data sources.

13. The method of claim 12, further comprising:

modifying a first configuration parameter of the throttle associated with a first data source of the plurality.

14. The method of claim 13, wherein the first configuration parameter includes a setting operable to direct the throttle to deny all calls made to the first data source, and to direct the throttle to send calls made to the first data source to a second data source of the plurality.

15. A non-transitory computer-readable storage medium including computer readable instructions for modifying configuration settings for a throttle management system, comprising:

instructions for receiving, from a client, a request for configuration parameters of a throttle coupled to a data source, the configuration parameters, to be provided to the client, including an expected response time for completing an operation on the data source, wherein the expected response time is determined by a time to complete a prior call to the data source, and a number of available permits to assign to the plurality of modules, wherein the number of available permits is adjustably configured in accordance with whether a previous operation performed by a first module of the plurality of modules was completed within the expected response time;

instructions for transmitting to the client, from a server, the configuration parameters of the throttle;

instructions for receiving, from the client, at least one modification to at least one configuration parameter based upon whether the previous operation was completed within the expected response time; and instructions for applying the at least one modification to the at least one configuration parameter of the throttle during runtime operation of the server.

16. The computer-readable storage medium of claim 15, wherein the configuration parameters include a parameter operable to direct the throttle to deny all calls made to the data source.

17. The computer-readable storage medium of claim 16, wherein the data source includes a plurality of data sources.

18. The computer-readable storage medium of claim 16, further comprising:

instructions for receiving a call to access a data source;

instructions for accessing the at least one modified configuration parameter; and instructions for denying all calls to the first data source based on the at least one modified configuration parameter.

19. The computer-readable storage medium of claim 15, wherein a throttle coupled to a data source includes a plurality of throttles, each throttle of the plurality coupled to at least one of a plurality of data sources.

20. The computer-readable storage medium of claim 19, further comprising instructions for modifying a first configuration parameter of the throttle associated with a first data source of the plurality.

21. The computer-readable storage medium of claim 20, wherein the first configuration parameter includes a setting operable to direct the throttle to deny all calls made to the first data source, and to direct the throttle to send calls made to the first data source to a second data source of the plurality.

* * * * *